(12) United States Patent
Ge

(10) Patent No.: US 9,204,206 B2
(45) Date of Patent: Dec. 1, 2015

(54) METHOD AND APPARATUS FOR TRANSMITTING SIGNALING

(71) Applicant: Huawei Device Co., Ltd., Shenzhen (CN)

(72) Inventor: Zhanghua Ge, Wuhan (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 107 days.

(21) Appl. No.: 13/906,042

(22) Filed: May 30, 2013

(65) Prior Publication Data

US 2014/0004844 A1    Jan. 2, 2014

(30) Foreign Application Priority Data

Jun. 29, 2012    (CN) .......................... 2012 1 0223379

(51) Int. Cl.
- H04B 7/24 (2006.01)
- H04W 84/14 (2009.01)
- H04W 92/00 (2009.01)
- H04Q 1/457 (2006.01)

(52) U.S. Cl.
CPC .................................. *H04Q 1/4575* (2013.01)

(58) Field of Classification Search
CPC .............................. H04Q 1/4575; H04W 84/14
See application file for complete search history.

(56) References Cited

U.S. PATENT DOCUMENTS

| | | | |
|---|---|---|---|
| 5,724,656 A * | 3/1998 | Vo et al. ..................... | 455/422.1 |
| 6,073,028 A | 6/2000 | Humphrey et al. | |
| 2003/0064755 A1* | 4/2003 | Piwowarski .................. | 455/563 |
| 2008/0279176 A1 | 11/2008 | Cheng | |

FOREIGN PATENT DOCUMENTS

| | | | |
|---|---|---|---|
| CN | 1203004 A | 12/1998 | |
| CN | 1284242 A | 2/2001 | |
| CN | 2579096 Y | 10/2003 | |
| CN | 2842592 Y | 11/2006 | |
| CN | 101304566 A | 11/2008 | |
| CN | 102790958 A | 11/2012 | |
| KR | 20090054694 A | 6/2009 | |
| WO | WO 01/13586 A1 * | 2/2001 | ...... H04L 2012/6475 |

\* cited by examiner

*Primary Examiner* — Jinsong Hu
*Assistant Examiner* — Tabla Glomah
(74) *Attorney, Agent, or Firm* — Brinks Gilson & Lione

(57) ABSTRACT

Embodiments of the present invention disclose a method and an apparatus for transmitting a signaling and relate to the field of wireless communication technologies. The method includes: detecting whether a feedback command is received from a base station, the feedback command being used to trigger the fixed wireless terminal to send a dual tone multi frequency signaling to the base station, where the dual tone multi frequency signaling is generated by the fixed wireless terminal according to a voice signal sent by an alarm host; determining the number of current unsent dual tone multi frequency signalings if the feedback command is received from the base station; combining all unsent dual tone multi frequency signalings into one dual tone multi frequency signaling if at least two dual tone multi frequency signalings exist; and sending the dual tone multi frequency signaling obtained by performing the combining to the base station.

10 Claims, 6 Drawing Sheets

METHOD AND APPARATUS FOR TRANSMITTING SIGNALING

CROSS-REFERENCE TO RELATED APPLICATIONS

This application claims priority to Chinese Patent Application No. 201210223379.3, filed on Jun. 29, 2012, which is hereby incorporated by reference in its entirety.

FIELD OF THE INVENTION

The present invention relates to the field of wireless communication technologies, and in particular, to a method and an apparatus for transmitting a signaling.

BACKGROUND OF THE INVENTION

With the development of wireless communication technologies, a Fixed Wireless Terminal (FWT) is applied to many communication systems that require signaling transmission. For example, as shown in FIG. 1, the FWT in the system can receive a voice signal from traditional devices such as fixed telephone sets and fax machines, convert the voice signal into a Dual Tone Multi Frequency (DTMF) signaling, and send the dual tone multi frequency signaling to a base station through a wireless network. The base station recovers the voice signal from the dual tone multi frequency signaling, and sends the voice signal to another fixed telephone set through a server in a public switched telephone network, thereby implementing accurate transmission of dual tone multi frequency signaling between two traditional telephone sets. In that process, after converting a voice signal into a dual tone multi frequency signaling and sending it to the base station, the FWT needs to wait for a feedback command from the base station. The FWT does not send a next dual tone multi frequency signaling to the base station until a feedback command is received from the base station.

The FWT sends a signaling to the base station, the base station receives the signaling, and the base station sends a feedback command to the FWT. Time required in this process is T, and a time interval between voice signals sent by the devices such as a fixed telephone set and a fax machine is t. Generally, T is less than or equal to t, that is, the time interval between signalings is generally greater than the time required for the FWT to wait for the feedback command. For example, a user dials 144, a time interval between 1 and 4 is 200 ms, a time interval between 4 and 4 is 210 ms, and the time spent by the FWT in receiving, converting and sending the voice signal of the digit 1 at the intervals until receiving a feedback command from the base station is 110 ms. That is, the FWT has received the feedback command before receiving the next voice signal so that the FWT can send a dual tone multi frequency signaling to the base station directly after receiving the next voice signal and converting it into the dual tone multi frequency signaling.

Further, many devices are capable of sending voice signals automatically. For example, in a security and defense system, an alarm host automatically sends multiple voice signals to a server in an alarm center at equal time intervals through a Public Switched Telephone Network (PSTN), where the time intervals are small, such as 50 ms.

The prior art has the following problems:

When a device sends voice signals automatically, because the time interval between voice signals is small, the time interval between signalings converted from the voice signals is small. If the FWT in the prior art processes the voice signals, before the FWT receives a feedback command from the base station, unsent signaling will congest the FWT; the FWT does not send a next signaling to the base station until it receives the feedback command in response to the previous signaling, which leads to a long period of time spent by the FWT in sending the signaling. For example, in many security and defense systems, the alarm host uses the FWT to send a voice signal to the alarm center for raising an alarm. However, because the time spent in sending the signaling is long, the alarm center suffers from a too great delay in receiving the voice signal for raising an alarm, which even leads to an alarm failure and reduces reliability of the security and defense system.

SUMMARY OF THE INVENTION

Embodiments of the present invention provide a method and an apparatus for transmitting a signaling to reduce time spent by a fixed wireless terminal in sending a signaling and improve reliability of a security and defense system.

To achieve the above objectives, the embodiments of the present invention employ the following technical solutions:

In one aspect, an embodiment of the present invention provides a method for transmitting a signaling, and the method is implemented by a fixed wireless terminal and includes:

detecting whether a feedback command is received from a base station, the feedback command being used to trigger the fixed wireless terminal to send a dual tone multi frequency signaling to the base station, where the dual tone multi frequency signaling is generated by the fixed wireless terminal according to a voice signal sent by an alarm host;

determining the number of current unsent dual tone multi frequency signalings if the feedback command is received from the base station;

combining all unsent dual tone multi frequency signalings into one dual tone multi frequency signaling if at least two dual tone multi frequency signalings exist; and sending the dual tone multi frequency signaling obtained by performing the combining to the base station.

In another aspect, an embodiment of the present invention provides an apparatus for transmitting a signaling, and the apparatus is implemented by a fixed wireless terminal and includes:

a feedback trigger module, configured to detect whether a feedback command is received from a base station, the feedback command being used to trigger the fixed wireless terminal to send a dual tone multi frequency signaling to the base station, where the dual tone multi frequency signaling is generated by the fixed wireless terminal according to a voice signal sent by an alarm host;

a first signaling detection module, configured to determine the number of current unsent dual tone multi frequency signalings if the feedback command is received from the base station;

a signaling combination module, configured to combine all unsent dual tone multi frequency signalings into one dual tone multi frequency signaling if at least two dual tone multi frequency signalings exist; and a sending module, configured to send the dual tone multi frequency signaling obtained by performing the combining to the base station.

The method and the apparatus for transmitting a signaling according to the embodiments of the present invention can combine multiple signalings that are cached in a fixed wireless terminal and to be sent into one signaling, and send the combined signaling to a base station after receiving a feedback command from the base station. In this way, the fixed wireless terminal can send all cached signalings each time, which reduces the number of times of sending the signaling. Compared with the prior art, in the present invention, all signalings are sent at fewer attempts, thereby reducing the total time of waiting for the feedback command from the base station, reducing the time spent in sending the signaling, and improving reliability of a security and defense system.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

To make advantages of the technical solutions of the present invention clearer, the following describes the present invention in detail with reference to accompanying drawings and embodiments.

Embodiment 1

Figure 1:
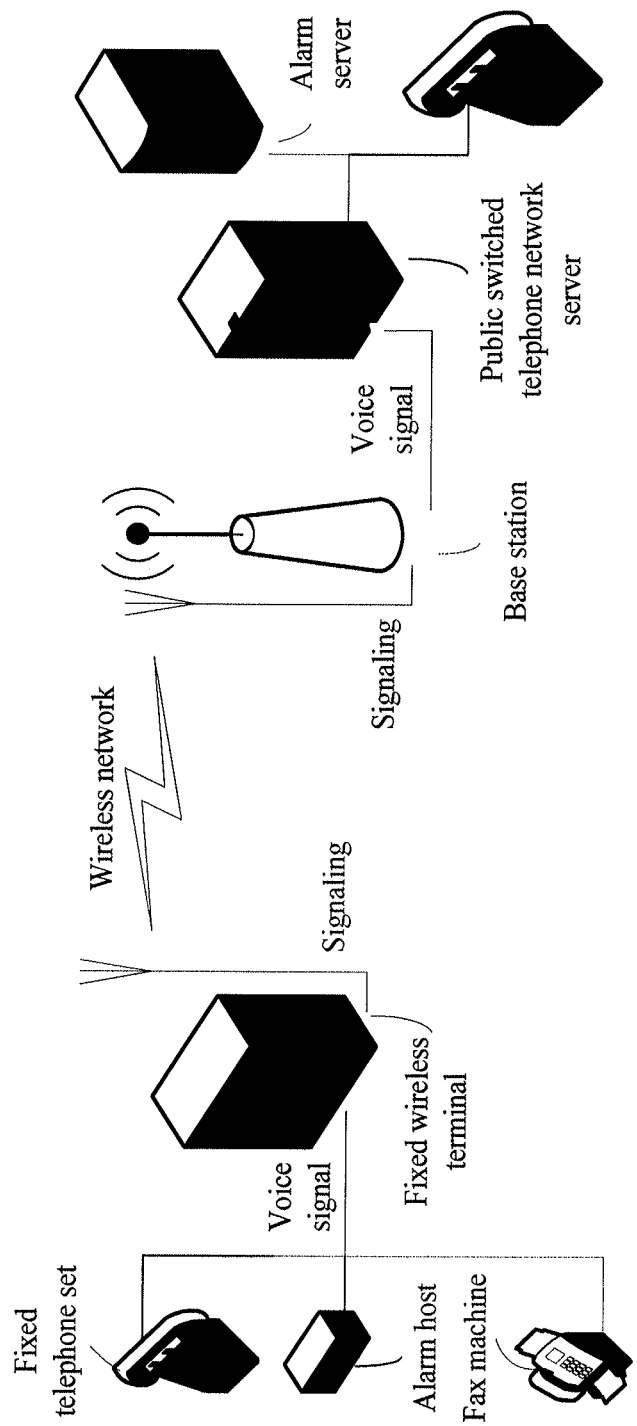
FIG. 1 is a schematic structural diagram of a signaling transmission system in the prior art.
Figure 2:
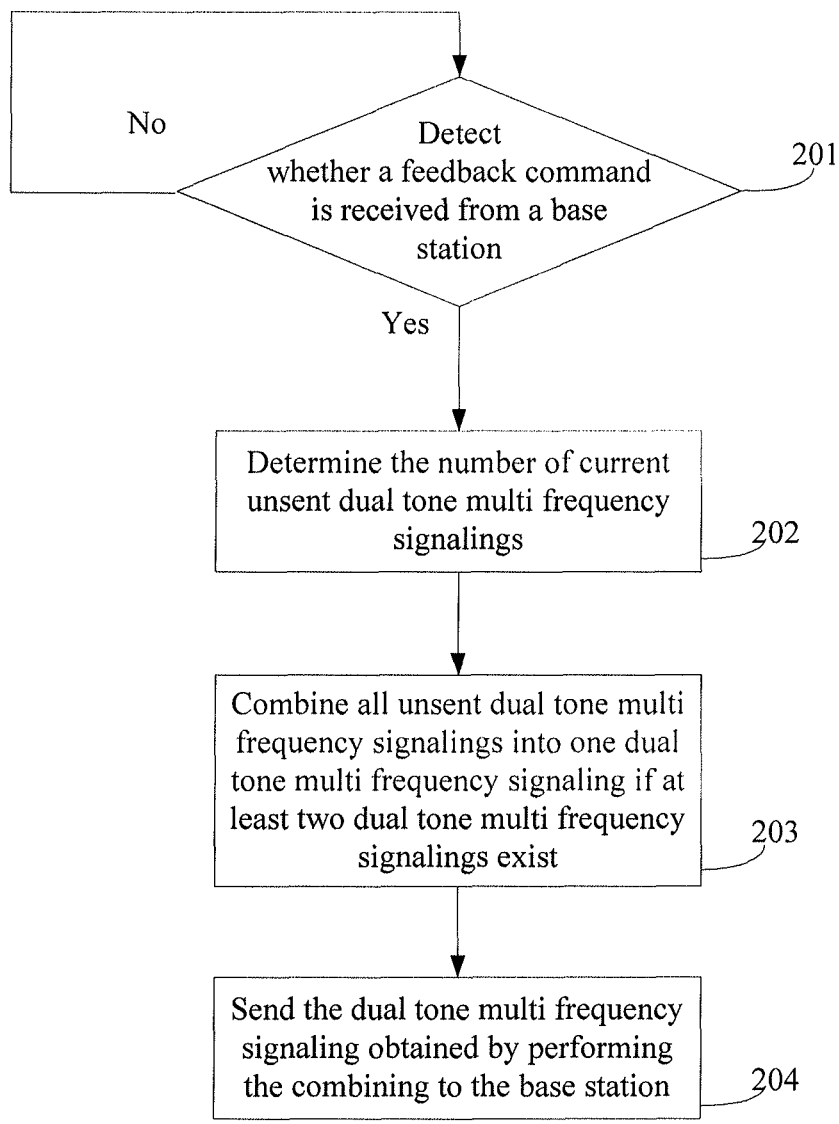
FIG. 2 is a flowchart of a method for transmitting a signaling according to Embodiment 1 of the present invention.

This embodiment of the present invention provides a method for transmitting a signaling, and the method is implemented by a fixed wireless terminal. As shown in FIG. 2, the method includes the following steps:

Step 201: Detect whether a feedback command is received from a base station.

The feedback command is used to trigger the fixed wireless terminal to send a dual tone multi frequency signaling to the base station, where the dual tone multi frequency signaling is generated by the fixed wireless terminal according to a voice signal sent by an alarm host.

Each time after the fixed wireless terminal sends a dual tone multi frequency signaling to the base station, the base station sends a feedback command to the fixed wireless terminal. The fixed wireless terminal sends a next dual tone multi frequency signaling only after receiving the feedback command. Specifically, in this embodiment, the fixed wireless terminal may use a conventional technical means to detect whether the feedback command is received from the base station. Further, if no feedback command is received from the base station, the fixed wireless terminal may detect again, at certain intervals, whether the feedback signaling is received from the base station.

Step 202: Determine the number of current unsent dual tone multi frequency signalings if the feedback command is received from the base station.

In this embodiment, the fixed wireless terminal may be connected to an alarm host in an existing security and defense system, and after receiving a voice signal sent by the alarm host, the fixed wireless terminal may use a conventional technical means to convert the voice signal into a corresponding dual tone multi frequency signaling. For example, the fixed wireless terminal may convert the voice signal sent by the alarm host in the security and defense system into a dual tone multi frequency signaling, and when no feedback command is received from the base station, the fixed wireless terminal may store the converted dual tone multi frequency signaling into a cache. In this way, the cached dual tone multi frequency signaling may be sent to the base station after the feedback command is received. Before the fixed wireless terminal receives the feedback command, multiple dual tone multi frequency signalings may be cached.

Step 203: Combine all unsent dual tone multi frequency signalings into one dual tone multi frequency signaling if at least two dual tone multi frequency signalings exist.

Specifically, in the present invention, the fixed wireless terminal may use a conventional technical means to combine all cached unsent dual tone multi frequency signalings into one dual tone multi frequency signaling. For example, the fixed wireless terminal may combine multiple DTMF signalings into one Burst DTMF signaling according to an existing communication transfer protocol.

Step 204: Send the dual tone multi frequency signaling obtained by performing the combining to the base station.

Specifically, in this embodiment, after receiving the feedback command from the base station, the fixed wireless terminal uses a conventional signaling receiving and sending means to send the dual tone multi frequency signaling obtained by performing the combining to the base station.

The method for transmitting a signaling according to this embodiment of the present invention can combine multiple signalings that are cached in a fixed wireless terminal and to be sent into one signaling, and send the combined signaling to a base station after receiving a feedback command from the base station. In this way, the fixed wireless terminal can send all cached signalings each time, which reduces the number of times of sending the signaling. Compared with the prior art, the present invention sends all signalings at few attempts, reduces the total time of waiting for the feedback command from the base station, reduces the time spent in sending the signaling, and improves reliability of a security and defense system.

Embodiment 2

Figure 3:
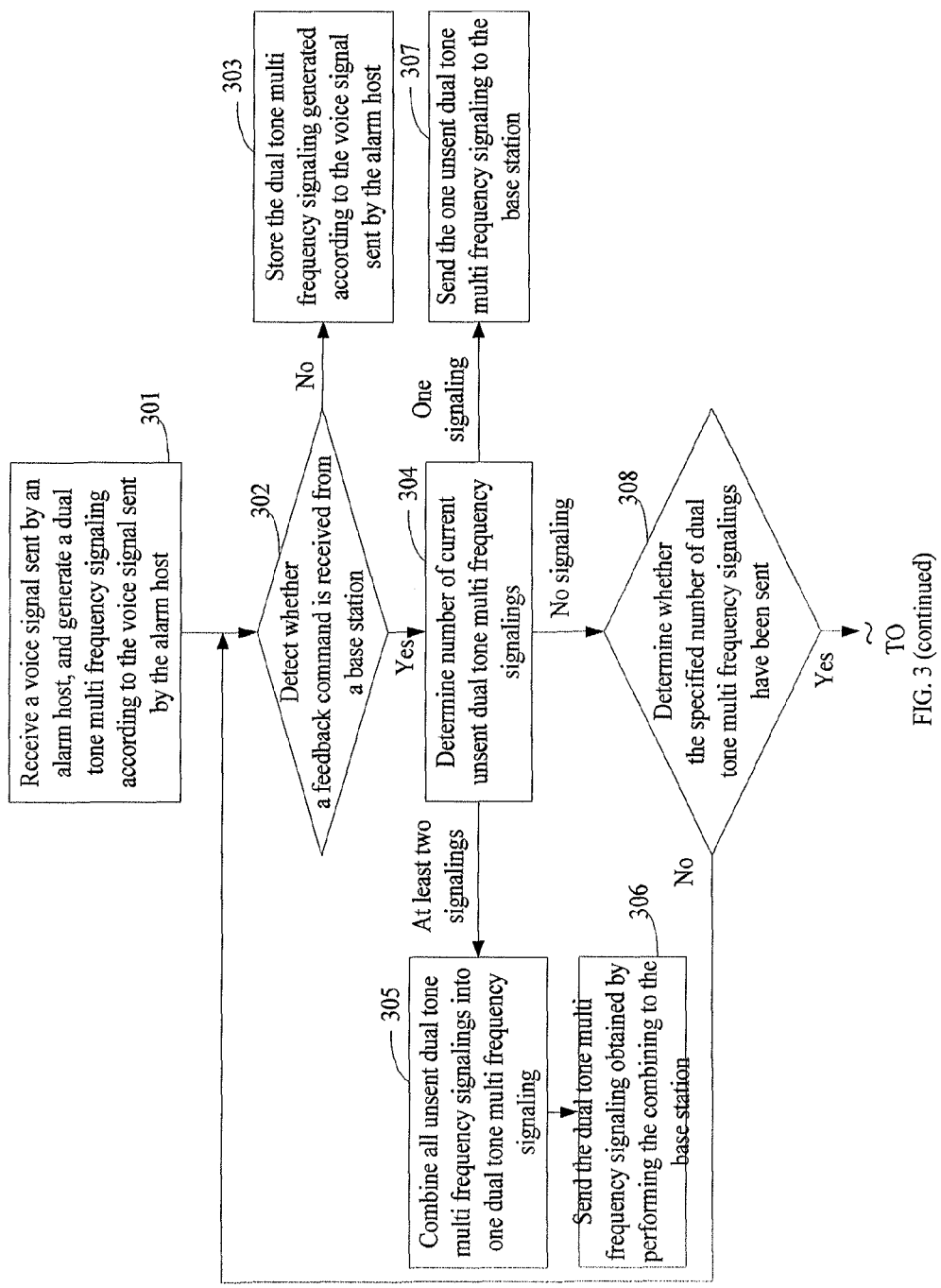
FIG. 3 is a flowchart of a method for transmitting a signaling according to Embodiment 2 of the present invention.
Figure 3:
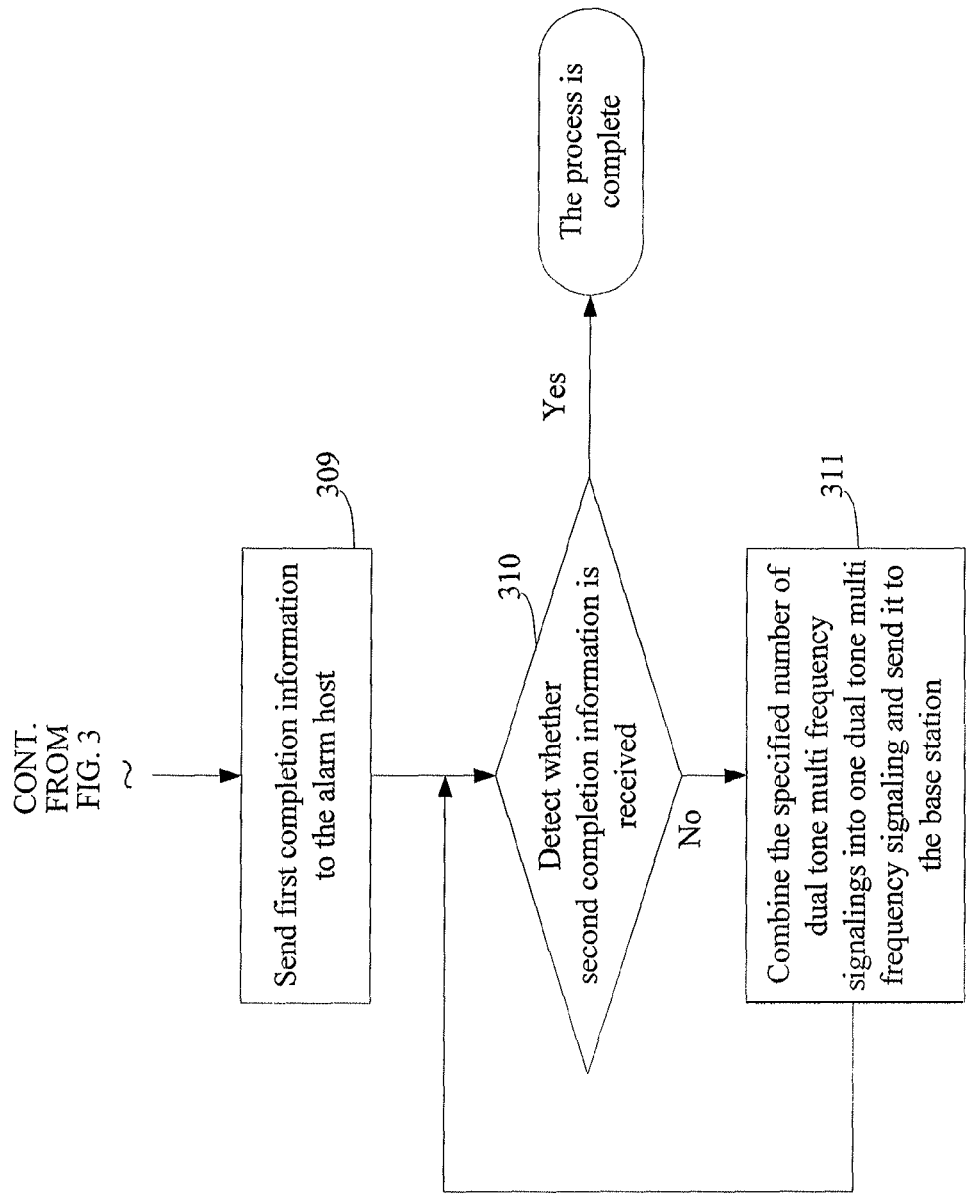

The embodiment of the present invention provides a method for transmitting a signaling. As shown in FIG. 3, the method includes the following steps:

Step 301: Receive a voice signal sent by an alarm host, and generate a dual tone multi frequency signaling according to the voice signal sent by the alarm host.

Corresponding to each voice signal, one dual tone multi frequency signaling is generated.

Specifically, in practical application of the present invention, the fixed wireless terminal may receive a voice signal sent by an alarm host in a security and defense system, and convert the received voice signal into a dual tone multi frequency signaling, that is, convert an analog signal (voice signal) into a digital signal (dual tone multi frequency signaling), for example:

In practical application, the fixed wireless terminal may receive a voice signal sent by an alarm host after the alarm host is connected, and convert the voice signal into a dual tone multi frequency signaling. For example, after being connected, the alarm host continues to dial a telephone number for raising an alarm. For example, after being connected, the alarm host inputs an alarm number such as "911". Each digit (0-9) or character (* or #) in the telephone number is sent to the fixed wireless terminal in the form of a voice signal. When receiving each voice signal, the fixed wireless terminal converts the received voice signal into a dual tone multi frequency signaling immediately, and stores the converted dual tone multi frequency signaling into a cache, or, after receiving a feedback command from the base station, sends the dual tone multi frequency signaling to the base station. For example, when the alarm host dials an 8-digit police number of a police station, the fixed wireless terminal needs to generate eight consecutive dual tone multi frequency signalings consecutively through conversion.

Step 302: Detect whether a feedback command is received from a base station.

The feedback command is used to trigger the fixed wireless terminal to send a dual tone multi frequency signaling to the base station, where the dual tone multi frequency signaling is generated by the fixed wireless terminal according to a voice signal sent by an alarm host.

Step 303: Store the dual tone multi frequency signaling generated according to the voice signal sent by the alarm host if no feedback command is received from the base station.

The stored dual tone multi frequency signaling generated according to the voice signal sent by the alarm host is an unsent dual tone multi frequency signaling.

Specifically, in this embodiment, the generated dual tone multi frequency signaling may be stored in the cache if another voice signal is received from the alarm host when the fixed wireless terminal has not received the feedback command from the base station.

Step 304: Determine the number of current unsent dual tone multi frequency signalings if the feedback command is received from the base station.

Step 305: Combine all unsent dual tone multi frequency signalings into one dual tone multi frequency signaling if at least two dual tone multi frequency signalings exist in the cache.

Step 306: Send the dual tone multi frequency signaling obtained by performing the combining to the base station.

Step 307: If only one unsent dual tone multi frequency signaling exists, send the unsent dual tone multi frequency signaling to the base station.

Specifically, in this embodiment, an unsent dual tone multi frequency signaling may be a unique unsent dual tone multi frequency signaling currently existent in the cache; or the fixed wireless terminal converts a latest voice signal received from the alarm host into a dual tone multi frequency signaling at the same moment, and the fixed wireless terminal may use a conventional technical means to send the dual tone multi frequency signaling to the base station.

By using the method for transmitting a signaling according to the embodiment of the present invention, multiple dual tone multi frequency signalings that are cached in a fixed wireless terminal and to be sent can be can combined into one dual tone multi frequency signaling, and the dual tone multi frequency signaling obtained by performing the combining is sent to a base station after a feedback command is received from the base station. In this way, the fixed wireless terminal can send all cached dual tone multi frequency signalings each time, which reduces the number of times of sending the dual tone multi frequency signaling and improves reliability of a security and defense system. Compared with the prior art, the present invention sends all dual tone multi frequency signalings at few attempts, reduces the total time of waiting for the feedback command from the base station, and reduces the time spent in sending the dual tone multi frequency signaling.

Further and optionally, the embodiment may further include:

Step 308: If no unsent dual tone multi frequency signaling exists, determine whether a specified number of dual tone multi frequency signalings have been sent.

Specifically, in this embodiment, the fixed wireless terminal may determine whether a specified number of dual tone multi frequency signalings have been sent. For example, after being connected, the alarm host continues to dial an 8-digit number, In a one-to-one mapping form, the digits in the 8-digit number are sent to the fixed wireless terminal in the form of eight voice signals, and are converted by the fixed wireless terminal into corresponding eight dual tone multi frequency signalings. Therefore, the specified number is 8, and the eight dual tone multi frequency signalings are chronological and correspond to the eight digits dialed by the alarm host. Therefore, the eight dual tone multi frequency signalings are also consecutive. After all the eight dual tone multi frequency signalings are sent to the base station, the fixed wireless terminal completes sending the specified number of dual tone multi frequency signalings.

If the specified number of dual tone multi frequency signalings have still not been sent, steps 302 to 307 are repeated until the specified number of dual tone multi frequency signalings all are sent.

Step 309: Send first completion information to the alarm host if the specified number of dual tone multi frequency signalings have been sent.

A sender is used to send voice signals to the fixed wireless terminal, and the first completion information is used to trigger the sender to stop sending the voice signals to the fixed wireless terminal.

In an existing security and defense system, for example, an alarm host may automatically send a series of consecutive voice signals to the fixed wireless terminal, and before receiving downlink completion information (such as kissoff information), the alarm host may send the previous series of consecutive voice signals again automatically at regular intervals till the corresponding completion information is received.

Specifically, in this embodiment, the fixed wireless terminal may send the first completion information to the alarm host to trigger the alarm host to stop sending voice signals to the fixed wireless terminal. For example, the fixed wireless terminal may automatically generate a piece of information, that is, fake kissoff information, and send the generated fake kissoff information to the alarm host so that the alarm host stops repeatedly sending the voice signals. The fake kissoff information exerts the same function as the kissoff information in the prior art, and can trigger the alarm host to stop sending voice signals to the fixed wireless terminal. But the difference lies in that the fake kissoff information is generated by the fixed wireless terminal and sent to the alarm host, but the kissoff information is generated by an uplink device (such as a server, a host in an alarm center, and the like) in an existing signaling transmission system and sent to the alarm host.

Step 310: When a specified duration expires after the first completion information is sent to the alarm host, detect whether second completion information is received.

The second completion information is used to trigger the fixed wireless terminal to stop sending the dual tone multi frequency signaling to the base station. The specified duration may be set by the user or automatically set by the fixed wireless terminal.

For example, the second completion information may be kissoff information sent by an uplink device in an existing signaling transmission system to the alarm host over the fixed wireless terminal. In this embodiment, the fixed wireless terminal has sent the fake kissoff information to the alarm host. Therefore, after the uplink device in the signaling transmission system sends the kissoff information to the fixed wireless terminal, the fixed wireless terminal does not need to forward the kissoff information to the alarm host.

Step 311: If no second completion information is received, combine the specified number of dual tone multi frequency signalings into one dual tone multi frequency signaling, and send the dual tone multi frequency signaling into which the specified number of dual tone multi frequency signaling have been combined to the base station.

Specifically, in practical application, the existing fixed wireless terminal may store the dual tone multi frequency signalings to be sent in a cache before sending the dual tone multi frequency signaling to the base station. In this embodiment, the fixed wireless terminal may store all dual tone multi frequency signalings generated according to the voice signals sent by the alarm host into the fixed wireless terminal, and when the dual tone multi frequency signaling needs to be re-sent to the base station, combine the specified number of cached consecutive dual tone multi frequency signalings into one dual tone multi frequency signaling, and send the dual tone multi frequency signaling to the base station. For example:

The alarm host dials an 8-digit police number. The fixed wireless terminal caches eight consecutive dual tone multi frequency signalings corresponding to the 8-digit telephone number dialed by the alarm host, and the fixed wireless terminal may combine the eight consecutive dual tone multi frequency signalings into one dual tone multi frequency signaling, and send the dual tone multi frequency signaling obtained by performing the combining to the base station.

The process is complete if the second completion information is received.

Further, at intervals of the specified duration, the fixed wireless terminal may send the dual tone multi frequency signaling into which the specified number of dual tone multi frequency signaling have been combined to the base station till the second completion information is received.

For example, the fixed wireless terminal may automatically detect whether the kissoff information is received from the uplink device in the signaling transmission system, and, if the kissoff information is not received, re-send the dual tone multi frequency signaling obtained by performing the combining to the base station until the kissoff information is received from the uplink device.

In the method process described in steps 308 to 311 in this embodiment, the fixed wireless terminal may send information to the uplink device in the signaling transmission system repeatedly in place of the sender. For example, in the prior art, if the alarm host serving as a sender needs to send voice signals to the uplink device in the transmission system repeatedly, the fixed wireless terminal needs to convert the voice signals re-sent by the alarm host into dual tone multi frequency signals one by one again by performing the same process, and send the converted dual tone multi frequency signalings to the base station consecutively. Each time after sending a dual tone multi frequency signaling, the fixed wireless terminal needs to wait and does not send a next dual tone multi frequency signaling until a feedback command is received from the base station. If the method process described in steps 308 to 312 in this embodiment is applied, the following two improvements may be made: 1. The dual tone multi frequency signaling re-sent by the fixed wireless terminal is stored in the cache of the fixed wireless terminal, thereby saving the time spent in receiving the voice signal from the alarm host again and in converting the voice signal into a dual tone multi frequency signaling; 2. The dual tone multi frequency signaling re-sent by the fixed wireless terminal is a combined dual tone multi frequency signaling, and the fixed wireless terminal needs to send it at only one attempt, thereby saving the time spent in waiting for the feedback command from the base station one by one after the dual tone multi frequency signaling is sent one by one in the prior art. In this way, the time spent in sending the dual tone multi frequency signaling is further reduced, especially the time spent in re-sending the dual tone multi frequency signaling.

Embodiment 3

Figure 4:
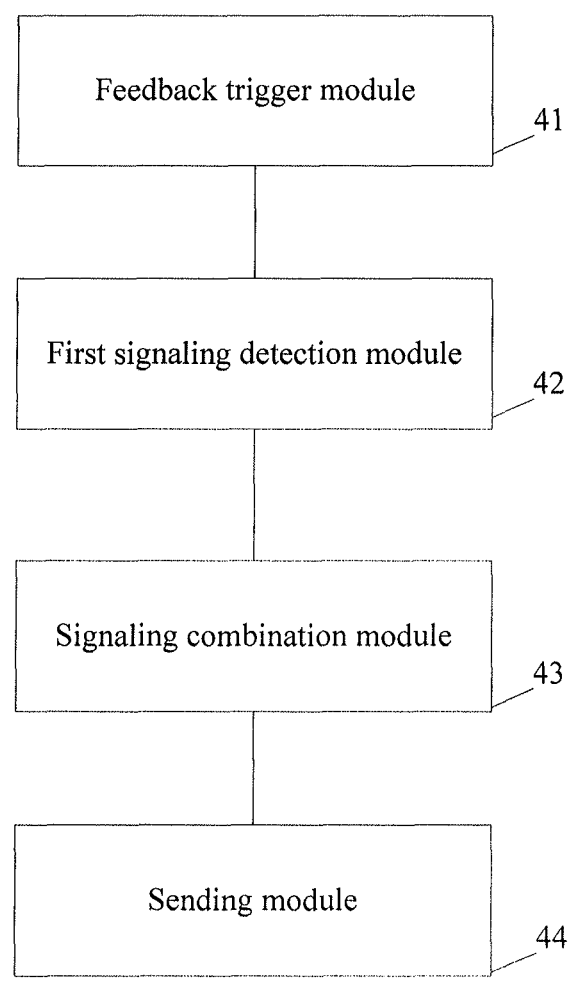
FIG. 4 is a schematic structural diagram of an apparatus for transmitting a signaling according to Embodiment 3 of the present invention.

The embodiment of the present invention provides an apparatus for transmitting a signaling. The apparatus involved in the present invention may run on a fixed wireless terminal. As shown in FIG. 4, the apparatus includes a feedback trigger module 41, a first signaling detection module 42, a signaling combination module 43 and a sending module 44, wherein:

the feedback trigger module 41 configured to detect whether a feedback command is received from a base station, where the feedback command is used to trigger the fixed wireless terminal to send a dual tone multi frequency signaling to the base station, where the dual tone multi frequency signaling is generated by the fixed wireless terminal according to a voice signal sent by an alarm host;

the first signaling detection module 42 configured to determine the number of current unsent dual tone multi frequency signalings if the feedback command is received from the base station;

the signaling combination module 43 configured to combine all unsent dual tone multi frequency signalings into one dual tone multi frequency signaling if at least two dual tone multi frequency signalings exist; and the sending module 44 configured to send the dual tone multi frequency signaling obtained by performing the combining to the base station.

The apparatus for transmitting a signaling according to the embodiment of the present invention can use a signaling combination module to combine multiple dual tone multi frequency signalings that are cached in a fixed wireless terminal and to be sent into one dual tone multi frequency signaling, and use a sending module to send the dual tone multi frequency signaling obtained by performing the combining to a base station after receiving a feedback command from the base station. In this way, the fixed wireless terminal can send all cached dual tone multi frequency signalings each time, which reduces the number of times of sending the dual tone multi frequency signaling. Compared with the prior art, the present invention sends all dual tone multi frequency signalings at few attempts, reduces the total time of waiting for the feedback command from the base station, reduces the time spent in sending the dual tone multi frequency signaling, and improves reliability of a security and defense system.

Embodiment 4

Figure 5:
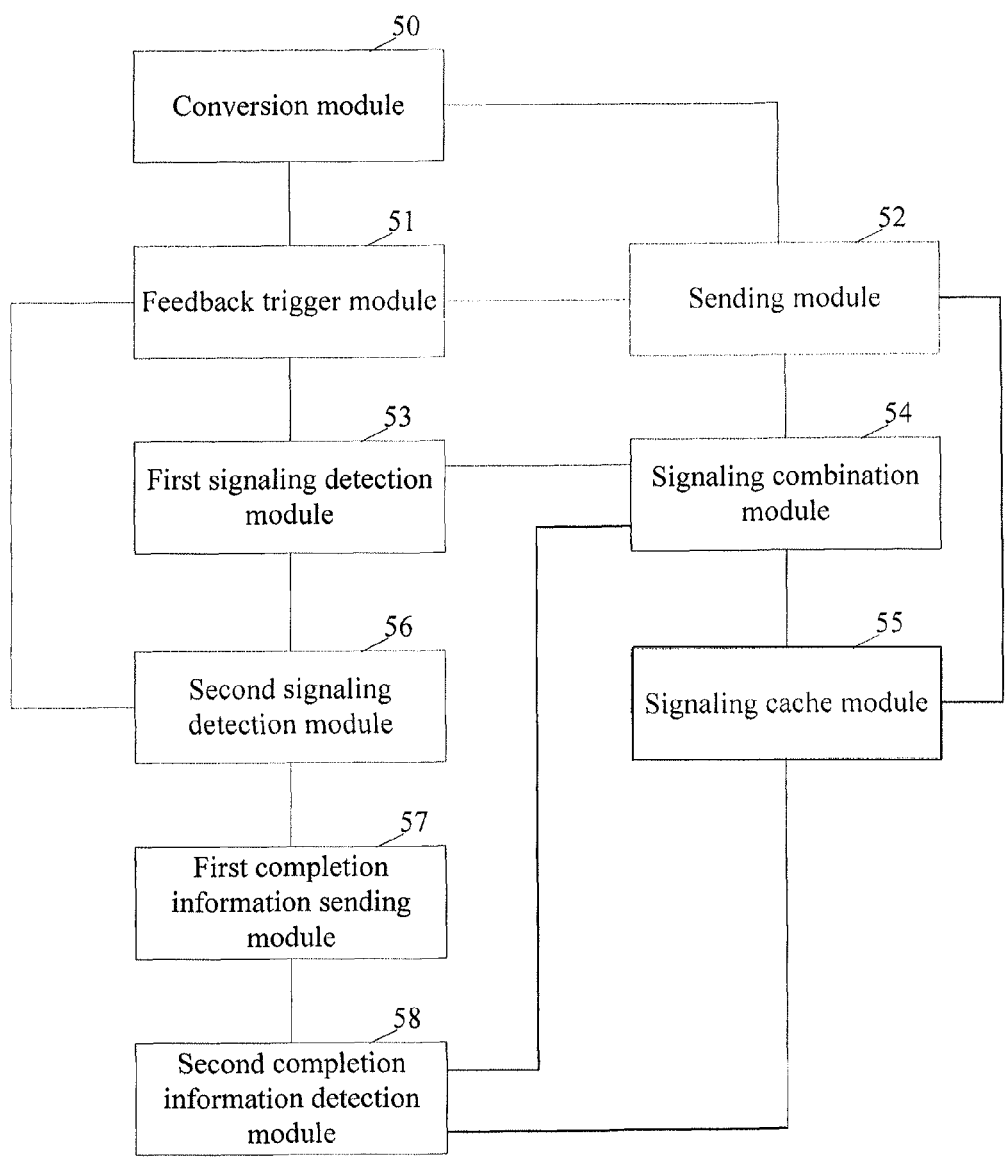
FIG. 5 is a schematic structural diagram of an apparatus for transmitting a signaling according to Embodiment 4 of the present invention.

The embodiment of the present invention provides an apparatus for transmitting a signaling. As shown in FIG. 5, the apparatus includes a conversion module 50, a feedback trigger module 51, a signaling cache module 52, a first signaling detection module 53, a signaling combination module 54 and a sending module 55, wherein:

the conversion module 50 configured to receive a voice signal sent by an alarm host, and generate a dual tone multi frequency signaling according to the voice signal sent by the alarm host, where corresponding to each voice signal, one dual tone multi frequency signaling is generated;

the feedback trigger module 51 configured to detect whether a feedback command is received from a base station, where the feedback command is used to trigger the fixed wireless terminal to send a dual tone multi frequency signaling to the base station, where the dual tone multi frequency signaling is generated by the fixed wireless terminal according to a voice signal sent by an alarm host;

the signaling cache module 52 configured to store the dual tone multi frequency signaling generated according to the voice signal sent by the alarm host if no feedback command is received from the base station, where the stored dual tone multi frequency signaling generated according to the voice signal sent by the alarm host is an unsent dual tone multi frequency signaling, and further, the signaling cache module 52 is further configured to store all dual tone multi frequency signalings generated according to the voice signals sent by the alarm host into the fixed wireless terminal;

the first signaling detection module 53 configured to determine the number of current unsent dual tone multi frequency signalings if the feedback command is received from the base station;

the signaling combination module 54 is configured to combine all unsent dual tone multi frequency signalings into one dual tone multi frequency signaling if at least two dual tone multi frequency signalings exist; and the sending module 55 configured to send the dual tone multi frequency signaling obtained by performing the combining to the base station, where the sending module 55 is further configured to: if only one unsent dual tone multi frequency signaling exists, send the only one unsent dual tone multi frequency signaling to the base station.

The apparatus for transmitting a signaling according to the embodiment of the present invention can use a signaling combination module to combine multiple dual tone multi frequency signalings that are cached in a fixed wireless terminal and to be sent into one dual tone multi frequency signaling, and use a sending module to send the dual tone multi frequency signaling obtained by performing the combining to a base station after receiving a feedback command from the base station. In this way, the fixed wireless terminal can send all cached dual tone multi frequency signalings each time, which reduces the number of times of sending the dual tone multi frequency signaling. Compared with the prior art, in the present invention, all signalings are sent at fewer attempts, thereby reducing the total time of waiting for the feedback command from the base station, reducing the time spent in sending the signaling, and improving reliability of a security and defense system.

Further and optionally, the apparatus of this embodiment may further include a second signaling detection module 56, a first completion information sending module 57 and a second completion information detection module 58, wherein:

the second signaling detection module 56 configured to: if no unsent dual tone multi frequency signaling exists, determine whether a specified number of dual tone multi frequency signalings have been sent;

the first completion information sending module 57 configured to send first completion information to the alarm host if the specified number of dual tone multi frequency signalings have been sent, where the first completion information is used to trigger the alarm host to stop sending the voice signal to the fixed wireless terminal; and the second completion information detection module 58 configured to: when a specified duration expires after the first completion information is sent to the alarm host, detect whether second completion information is received, where the second completion information is used to trigger the fixed wireless terminal to stop sending the dual tone multi frequency signaling to the base station.

Further, the second completion information detection module 58 is further configured to: after the dual tone multi frequency signaling into which the specified number of dual tone multi frequency signalings have been combined is sent to the base station for a first time, detect, at intervals of the specified duration, whether the second completion information is received.

The signaling combination module 54 is further configured to combine the specified number of dual tone multi frequency signalings into one dual tone multi frequency signaling if the second completion information detection module 58 does not receive the second completion information.

The sending module 55 is further configured to send the dual tone multi frequency signaling which is generated by the signaling combination module 54 by combining the specified number of dual tone multi frequency signalings, to the base station.

The signaling cache module 52 is further configured to store all dual tone multi frequency signalings generated according to the voice signals sent by the alarm host into the fixed wireless terminal.

The sending module 55 is further configured to: at intervals of the specified duration, send the dual tone multi frequency signaling into which the specified number of dual tone multi frequency signalings have been combined which is stored by the signaling cache module 52, to the base station until the second completion information detection module 58 detects that the fixed wireless terminal has received the second completion information.

The detailed running mode of the apparatus and the method process that governs the running of the apparatus have been detailed in Embodiment 2, and are not repeated here any further.

In this embodiment, the fixed wireless terminal may use a second completion information detection module to send information to an uplink device in a signaling transmission system repeatedly in place of a sender. The dual tone multi frequency signaling re-sent by the fixed wireless terminal is stored in the cache of the fixed wireless terminal, thereby saving the time spent in receiving the voice signal from the sender again and in converting the voice signal into a dual tone multi frequency signaling; the dual tone multi frequency signaling re-sent by the fixed wireless terminal is a dual tone multi frequency signaling combined by the signaling combination module, and the fixed wireless terminal needs to send it at only one attempt, thereby saving the time spent in waiting for the feedback command from the base station one by one after the dual tone multi frequency signaling is sent one by one in the prior art. In this way, the time spent in sending the dual tone multi frequency signaling is further reduced, especially the time spent in re-sending the dual tone multi frequency signaling.

Person of ordinary skill in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a Read-Only Memory (ROM), or a Random Access Memory (RAM).

The foregoing descriptions are merely specific embodiments of the present invention, but are not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope claimed by the claims.

What is claimed is:

1. A method for transmitting a signaling, wherein the method is implemented by a fixed wireless terminal, comprising:

detecting whether a base station's feedback command has been received, the base station's feedback command being used to trigger the fixed wireless terminal to send a dual tone multi frequency (DTMF) signaling to the base station for processing, wherein the dual tone multi frequency signaling is generated by the fixed wireless terminal according to a voice signal sent by an alarm host device;

wherein all DTMF signaling generated according to the voice signal sent by the alarm host device are stored in the fixed wireless terminal, and the method further comprises:

if no unsent DTMF signaling exists, determining whether a specified number of DTMF signaling have been sent;

sending first completion information to the alarm host device, if the specified number of DTMF signaling have been sent, wherein the first completion information is used to trigger the alarm host device to stop sending the voice signal to the fixed wireless terminal;

when a specified duration expires after the first completion information is sent to the alarm host device, detecting whether second completion information is received, wherein the second completion information is used to trigger the fixed wireless terminal device to stop sending the DTMF signaling to the base station;

if no second completion information is received, combining the specified number of DTMF signaling into the one DTMF signaling, and sending the DTMF signaling into which the specified number of DTMF signaling have been combined to the base station; and sending, at intervals of the specified duration, the DTMF signaling into which the specified number of DTMF signaling have been combined, to the base station until the second completion information is received;

determining the number of current unsent dual tone multi frequency signaling, if the base station's feedback command is received;

combining all unsent dual tone multi frequency signaling into one dual tone multi frequency signaling, if at least two dual tone multi frequency signaling exist; and sending the combined one dual tone multi frequency signaling to the base station for processing.

2. The method for transmitting a signaling according to claim 1, wherein before the detecting whether the base station's feedback command is received, the method further comprises:

receiving the voice signal sent by the alarm host, and generating a dual tone multi frequency signaling according to the voice signal sent by the alarm host device, wherein the one dual tone multi frequency signaling is generated, corresponding to each voice signal.

3. The method for transmitting a signaling according to claim 1, comprising:

sending only one unsent dual tone multi frequency signaling to the base station, if the only one unsent dual tone multi frequency signaling exists.

4. The method for transmitting a signaling according to claim 1, comprising:

if no base station's feedback command is received, storing the dual tone multi frequency signaling generated according to the voice signal sent by the alarm host device, wherein the stored dual tone multi frequency signaling generated according to the voice signal sent by the alarm host device is the unsent dual tone multi frequency signaling.

5. The method for transmitting a signaling according to claim 1, wherein all dual tone multi frequency signaling generated according to the voice signal sent by the alarm host device are stored in the fixed wireless terminal, and the method further comprises:

when a specified duration expires after the first completion information is sent to the alarm host device, detecting whether second completion information is received, wherein the second completion information is used to trigger the fixed wireless terminal to stop sending the dual tone multi frequency signaling to the base station;

if no second completion information is received, combining the specified number of dual tone multi frequency signaling into the one dual tone multi frequency signaling, and sending the dual tone multi frequency signaling into which the specified number of dual tone multi frequency signaling have been combined to the base station; and sending, at intervals of the specified duration, the dual tone multi frequency signaling into which the specified number of dual tone multi frequency signaling have been combined, to the base station until the second completion information is received.

6. An apparatus for transmitting a signaling, wherein the apparatus is implemented by a fixed wireless terminal, comprising at least a processor executing program codes stored in a memory, which configure the fixed wireless terminal to:

detect whether a base station's feedback command has been received, the base station's feedback command being used to trigger the fixed wireless terminal to send a dual tone multi frequency (DTMF) signaling to the base station, wherein the dual tone multi frequency signaling is generated by the fixed wireless terminal according to a voice signal sent by an alarm host device;

wherein all DTMF signaling generated according to the voice signal sent by the alarm host device are stored in the fixed wireless terminal,
if no unsent DTMF signaling exists, determining whether a specified number of DTMF signaling have been sent;
sending first completion information to the alarm host device, if the specified number of DTMF signaling have been sent, wherein the first completion information is used to trigger the alarm host device to stop sending the voice signal to the fixed wireless terminal;
when a specified duration expires after the first completion information is sent to the alarm host device, detecting whether second completion information is received, wherein the second completion information is used to trigger the fixed wireless terminal device to stop sending the DTMF signaling to the base station;
if no second completion information is received, combining the specified number of DTMF signaling into the one DTMF signaling, and sending the DTMF signaling into which the specified number of DTMF signaling have been combined to the base station; and
sending, at intervals of the specified duration, the DTMF signaling into which the specified number of DTMF signaling have been combined, to the base station until the second completion information is received;
determine the number of current unsent dual tone multi frequency signaling, if the base station's feedback command is received;
combine all unsent dual tone multi frequency signaling into one dual tone multi frequency signaling, if at least two dual tone multi frequency signaling exist; and
send the combined one dual tone multi frequency signaling to the base station.

7. The apparatus for transmitting a signaling according to claim 6, wherein before detecting whether the base station's feedback command is received from a base station, the fixed wireless terminal is further configured to:
receive the voice signal sent by the alarm host device, and generate the dual tone multi frequency signaling according to the voice signal sent by the alarm host device, wherein one dual tone multi frequency signaling is generated, corresponding to each voice signal.

8. The apparatus for transmitting a signaling according to claim 6, wherein the fixed wireless terminal is further configured to:
if only one unsent dual tone multi frequency signaling exists, send the only one unsent dual tone multi frequency signaling to the base station.

9. The apparatus for transmitting a signaling according to claim 6, wherein the fixed wireless terminal is further configured to:
if no base station's feedback command is received, store the dual tone multi frequency signaling generated according to the voice signal sent by the alarm host device, wherein the stored dual tone multi frequency signaling generated according to the voice signal sent by the alarm host device is the unsent dual tone multi frequency signaling.

10. The apparatus for transmitting a signaling according to claim 6, wherein the fixed wireless terminal is further configured to store all dual tone multi frequency signaling generated according to the voice signal sent by the alarm host device into the fixed wireless terminal, and the fixed wireless terminal further configured to:
when a specified duration expires after the first completion information is sent to the alarm host device, detect whether second completion information is received, wherein the second completion information is used to trigger the fixed wireless terminal to stop sending the dual tone multi frequency signaling to the base station; wherein:
if no second completion information is received, combine the specified number of dual tone multi frequency signaling into one dual tone multi frequency signaling;
send the dual tone multi frequency signaling into which the specified number of dual tone multi frequency signaling have been combined to the base station; and send, at intervals of the specified duration, the dual tone multi frequency signaling into which the specified number of dual tone multi frequency signaling have been combined to the base station until the second completion information detection module detects that the fixed wireless terminal has received the second completion information; and
after the dual tone multi frequency signaling into which the specified number of dual tone multi frequency signaling have been combined is sent to the base station for a first time, detect, at intervals of the specified duration, whether the second completion information is received.

* * * * *